UNITED STATES PATENT OFFICE.

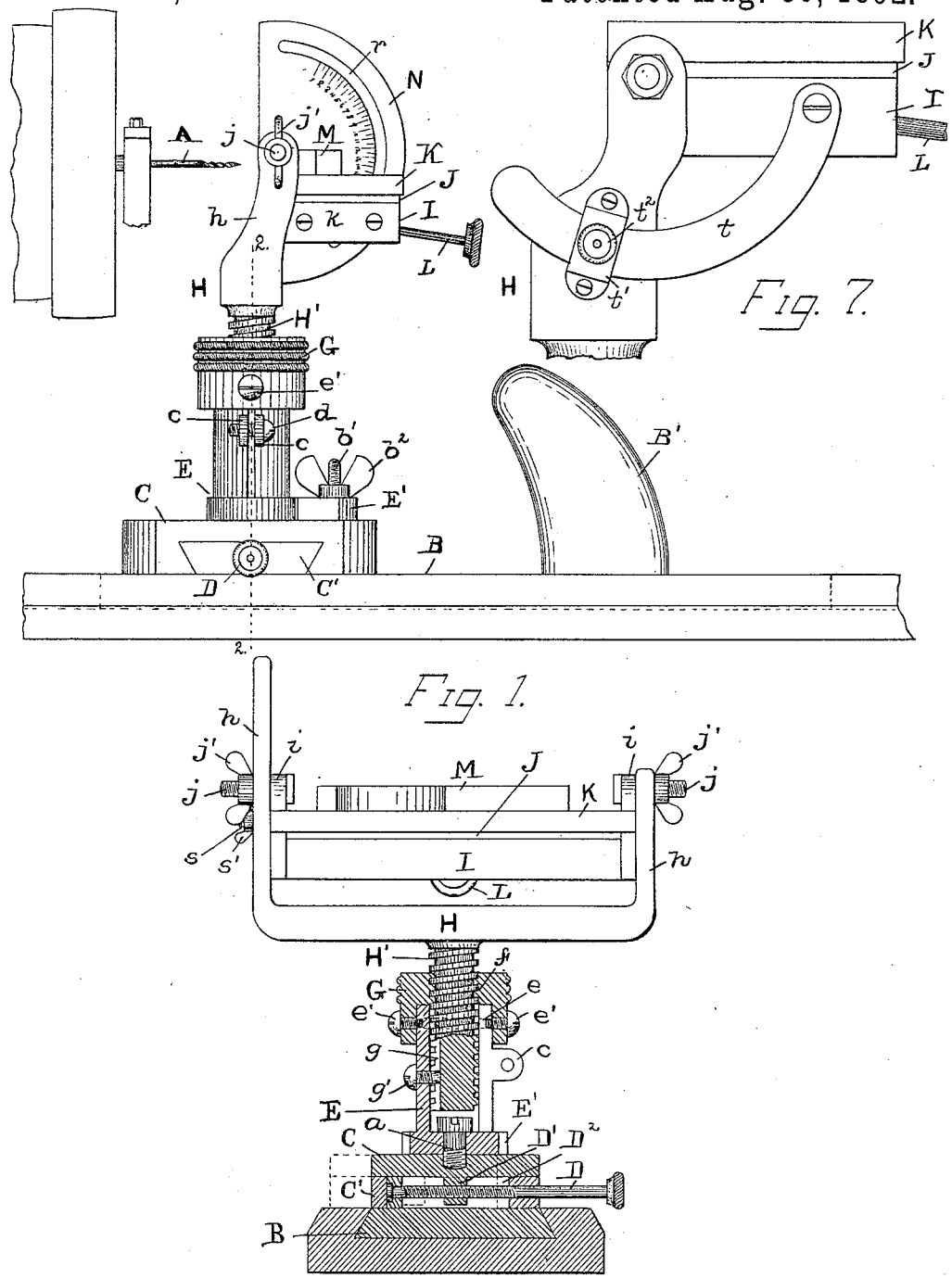

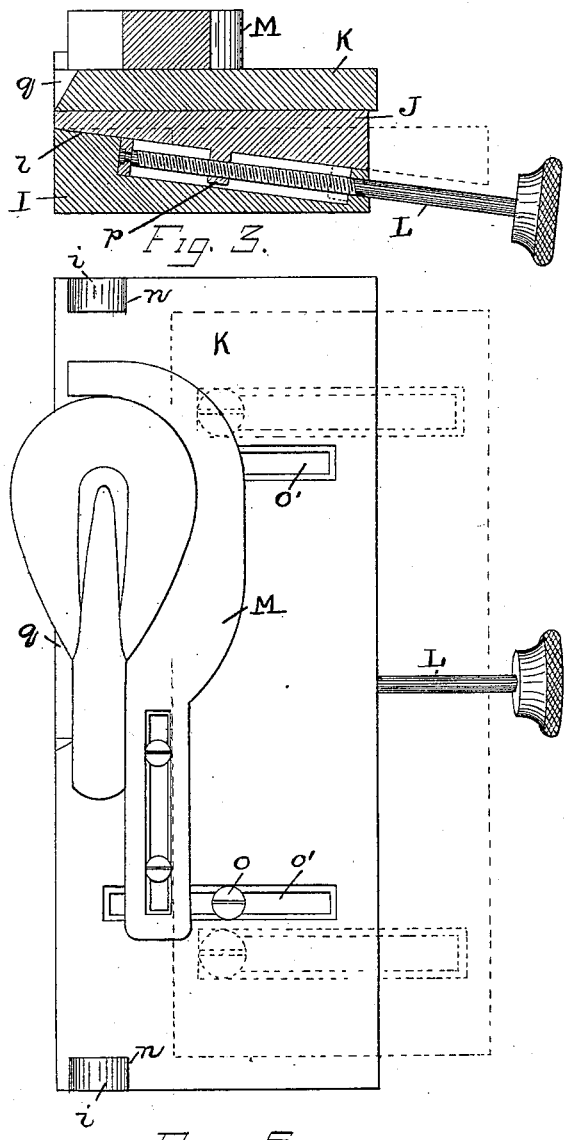
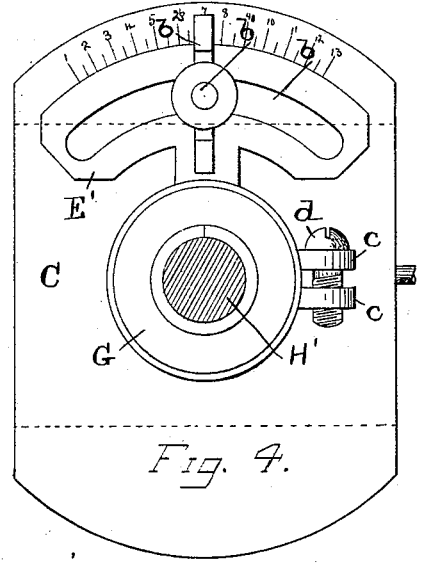
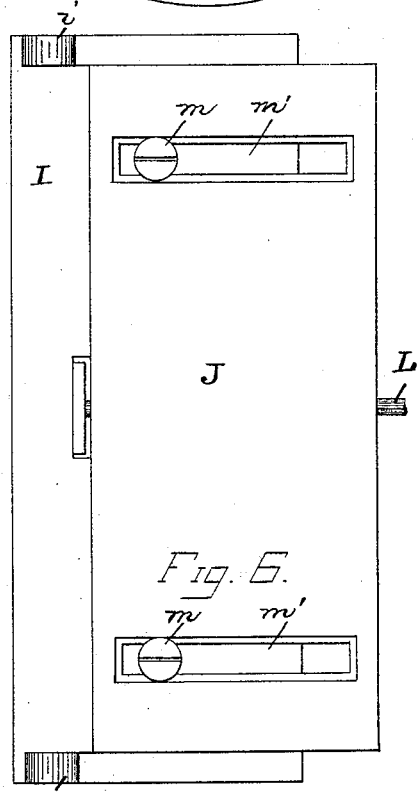

FREDERICK SCHEIDT, OF BALTIMORE, MARYLAND.

WORK-HOLDER FOR BORING-MACHINES.

SPECIFICATION forming part of Letters Patent No. 481,737, dated August 30, 1892.

Application filed February 20, 1892. Serial No. 422,208. (No model.)

*To all whom it may concern:*

Be it known that I, FREDERICK SCHEIDT, a citizen of the United States, residing at Baltimore city, in the State of Maryland, have invented certain new and useful Improvements in Work-Holders for Boring-Machines, of which the following is a specification.

This invention relates to an improved adjustable table or work-holder for use in connection with a boring tool or machine. The object is to provide a construction capable of such adjustment as to hold work placed on the table in a position to be bored on any angle and at any place, whereby the operator's fingers are in no danger of being injured during the operation and at the same time the action of the boring-tool on the work is clearly visible.

To this end the invention may be said to consist in the peculiar features of construction and combinations of parts hereinafter described and claimed.

The invention is illustrated in the accompanying drawings, in which Figure 1 is a side elevation of the improved holder and shows the position it occupies with respect to the boring-tool. Fig. 2 is a vertical section on line 2 2 of Fig. 1 with the upper part of the holder in front elevation; Fig. 3, a central longitudinal and vertical section of the swinging table; Fig. 4, a plan view of the laterally-sliding head and swivel-plate thereon; Fig. 5, a plan view of the swinging table; Fig. 6, a plan view of the said table with the top board removed to show the wedge-block for elevating the said top board. Fig. 7 shows a side elevation of a modified construction.

The holder is used in connection with a boring-tool such as designated by the letter A in the drawings, which tool revolves continuously, but remains in one position.

A carriage B is provided, which fits a dovetailed slideway, so that it may be moved up to and away from the boring-tool, said carriage having a handle B' on the upper side by which it is worked. At its forward part or that end nearest the boring-tool the carriage has a raised transverse dovetailed slideway C', on which fits a head C. This head may be adjusted to any position on said slideway by means of a knurled-head screw D, extending through the slideway and so mounted as to have no longitudinal movement. Said screw engages a threaded lug or stationary nut D' on the head, which lug may travel in recess D² in the slideway, as shown.

Upon the upper side of the head C is a tubular or socketed standard E, through the center of whose base extends a pin or screw $a$ into the said head C. The standard thus has a limited swiveling movement and may be adjusted to different positions by means of a side extension E', having an arc-shaped slot $b$, engaged by a bolt $b'$, projecting from the head C and carrying a tightening thumb-nut $b^2$. This tubular standard has a vertical slot or split, and on each side of the split is a flange $c$, and a screw-headed bolt $d$ passes through said flanges. The tubular standard E near its top has an annular groove $e$ around the outside, and an adjusting-collar G fits upon the top of the standard and has a flange which takes around the outside of the same and is provided with pins or screws $e'$, inserted through it with their ends entering the said annular groove. The said ring-collar is free to turn around the standard, the screws $e'$ traveling in the annular groove $e$. The upper end of the collar is interiorly threaded, as shown at $f$, the diameter through the groove of the screw-threads being the same as the diameter of the socket of the standard.

A suitable bracket H has a vertical screw-shank H' at the middle, which passes through the collar G and engages the threads $f$ and enters the standard E, which latter constitutes a socket for it. It will be seen that by turning the collar G, which is suitably milled on its exterior, the screw-shank H' will be raised or lowered. In this vertical movement said shank is guided and prevented from turning by means of a vertical spline-groove $g$, with which it is provided, and a pin $g'$, fastened in the standard E, with its end projecting into said groove. The screw-shank may be locked at any adjustment by tightening the screw-bolt $d$, and thereby binding the split standard on or around the shank.

The bracket H has two upright arms $h$, between which a swinging table is supported. This table is made up as follows: A base-board I has two arms $i$, one at each end at the front, by which it is suspended, said arms being hung on bolts $j$, projecting inwardly from the bracket-arms $h$. These bolts pass through the said bracket-arms and have tightening thumb-nuts $j'$ on the ends. The table is pivoted or capable of swinging on the bolts $j$. The said base-board has upright side pieces $k$ and an inclined upper surface $l$, forming a slideway, which rises toward the front. A wedge-shaped rectangular block J fits upon this slideway with its thinnest part toward the front. The wedge-block and base-board are connected together by screws $m$, secured in the latter and engaging slots $m'$ in the block, the slots being reamed out, so that the heads of said screws may be below the upper surfaces of the block. A top board or table-surface K rests upon the wedge-block and has notches or gains $n$ to accommodate the arms $i$ and is connected with the wedge-block by screws $o$, which extend through slots $o'$ in the top board and enter the said wedge. Now it will be seen that by sliding the wedge-block in or out the top board or table-surface K will be raised or lowered. The movement of the wedge is accomplished by means of a knurled-head screw L, which has a bearing at its rear end in the base-board I and is mounted to have no longitudinal movement. Said screw works through a threaded lug or stationary nut $p$ on the said wedge-block, and the latter and the base-board are recessed out to accommodate the screw and lug. Thus the wedge and screw serve to effect a very slight vertical adjustment after all the other adjustments have been made.

The work or article to be bored is carried on the top board K in a suitable rest or holder—such as M—secured thereon, and the said top board is notched or cut away at its front central part, as shown at $q$, to give the boring-tool free access to the work on the table in whatever position it may be held. As before explained, the table is pivoted at its forward part by the bolts $j$. The adjustment of this table to different angular positions is secured as follows: One of the arms $h$ of the bracket H is provided with a segmental extension N, having an arc-shaped slot $r$. A threaded pin $s$, projecting from the swinging table, extends through this slot and has on its end a locking thumb-nut $s'$. The table may be made steadier and more secure after adjustment by tightening the nuts $j'$.

My arrangement is specially adapted for use in boring hammers for piano-actions, and one of such hammers (designated by the letter O) is shown in the drawings, Fig. 5, held on the table in the rest or holder M, which is made of a shape to properly receive and hold it. A set of hammers for a piano are bored on different angles varying from each in slight degree and the utmost exactness is required in the boring operation. This has heretofore been conducted by manipulating the piece to be bored by hand, which is accompanied with considerable danger to the operator.

By the sliding head C lateral adjustment of the holder is obtained. By the collar and screw-shank vertical adjustment is obtained. By the swivel-socket E angular adjustment in a horizontal plane may be had. By means of the pivoted or swinging table angular adjustment in a vertical plane is obtained, and for extreme nicety of vertical adjustment the sliding wedge J is brought into play. By these means it will be obvious the work may be presented to the boring-tool so that a hole may be bored at the exact place and in the precise direction desired.

My apparatus is adapted for boring any sort of work that may be carried on the table, and to render it serviceable for work other than piano-hammers, which by reason of its dimensions could not be held between the arms $h$ of the bracket H, I may employ the construction illustrated in Fig. 7, where the table is so hung that its top surface is above the supporting-pivot, and the angular adjustment of said table is secured by means of an arc-shaped arm $t$, fastened to the table and extending downward and passing through a keeper $t'$ on the bracket H, which keeper has a suitable locking set-screw $t^2$.

It is evident numerous departures may be made from the construction and arrangement of parts here shown and described, and hence I do not confine myself thereto.

Having thus described my invention, what I claim as new, and desire to secure by Letters Patent, is—

1. In a work-holder for boring-machines, the combination of a carriage arranged to be moved toward and away from the boring-tool, a swiveled standard on said carriage and having a side extension with an arc slot, a fastener engaging said arc slot and adapted to lock the swiveled standard at different positions in a horizontal plane, and a table supported by said standard.

2. In a work-holder for boring-machines, the combination of a carriage arranged to be moved toward and away from the boring-tool, a tubular standard on said carriage and having an exterior annular groove, a screw-shank fitting in said standard, a threaded collar fitting on the standard and engaging the screw-shank, said collar having pins which engage the exterior groove in the standard, and a table supported by the screw-shank.

3. In a work-holder for boring-machines, the combination of a carriage arranged to be moved up to and away from the boring-tool, a tubular standard on said carriage, having a vertical slot or split and provided with a screw-bolt to draw the split parts together, a screw-shank fitting in said standard, a threaded revoluble collar loosely confined on the said standard and engaging the screw-shank, and a table supported by the said screw-shank.

4. In a work-holder for boring-machines, the combination of a carriage arranged to be moved toward and away from the boring-tool, a standard on said carriage, a vertically-adjustable shank fitting said standard and having a bracket at its upper end comprising a horizontal cross-arm and two vertical side arms, a table between said two side arms and pivotally connected with the same at its forward part, and means for adjusting said table at different angular positions in a vertical plane, substantially as described.

5. In a work-holder for boring-machines, the combination of a carriage arranged to be moved toward and away from the boring-tool, a bracket having two side arms and supported on said carriage, a table between the said two side arms and comprising a base-board pivotally connected therewith, a top board, and a movable wedge between said base-board and top board, and means for adjusting the table at different angular positions in a vertical plane.

6. In a work-holder for boring-machines, the combination of a carriage arranged to be moved toward and away from the boring-tool, a standard on said carriage, a vertically-adjustable shank fitting said standard and having a bracket at its upper end comprising a horizontal cross-arm and two vertical side arms, a table between said two side arms and comprising a base-board pivotally connected therewith, a top board and a movable wedge between said base-board and top board, and means for adjusting said table at different angular positions in a vertical plane.

7. A work-holder for boring-machines, arranged to be moved up to and away from the boring-tool and having a table on which the work is held, said table arranged to have a lateral adjustment, a vertical adjustment, an angular adjustment in a horizontal plane, and an angular adjustment in a vertical plane and having a separately-adjustable top.

In testimony whereof I affix my signature in the presence of two witnesses.

FREDERICK SCHEIDT.

Witnesses:
F. PARKER DAVIS,
JNO. T. MADDOX.